United States Patent [19]
Biermann et al.

[11] 3,963,541
[45] June 15, 1976

[54] METHOD OF MANUFACTURING REACTION MIXTURES OF FINELY DIVIDED METALS OR ALLOYS AND SOLID PERHALOGENATED CARBON COMPOUNDS

[75] Inventors: Udo Klaus Paul Biermann, Eindhoven; Johann Schroder, Aachen, both of Germany

[73] Assignee: U.S. Philips Corporation, New York, N.Y.

[22] Filed: June 13, 1973

[21] Appl. No.: 369,751

[30] Foreign Application Priority Data
June 21, 1972 Germany............................ 2230120

[52] U.S. Cl.............................. 149/19.92; 149/19.3; 149/87

[51] Int. Cl.$^2$......................................... C06B 45/10
[58] Field of Search................... 149/87, 19.3, 19.92

[56] References Cited
UNITED STATES PATENTS
3,791,889  2/1974  Schroder........................... 149/87 X

*Primary Examiner*—Stephen J. Lechert, Jr.
*Attorney, Agent, or Firm*—Frank R. Trifari; Norman N. Spain

[57] ABSTRACT

A method of manufacturing a mixture of finely divided metals and solid perhalogenated carbon compounds, which mixture is capable of reaction when it is ignited, in which perhalogenated carbon compounds are used as solvents.

2 Claims, No Drawings

METHOD OF MANUFACTURING REACTION MIXTURES OF FINELY DIVIDED METALS OR ALLOYS AND SOLID PERHALOGENATED CARBON COMPOUNDS

The invention relates to a method of manufacturing a mixture of finely divided metals or alloys and solid perhalogenated carbon compounds which mixture is capable of reaction when it is ignited, the metal or the alloy being dispersed in a solvent of the carbon compound and the solvent being subsequently evaporated.

For the manufacture of reaction mixtures of finely divided metals or alloys and solid perhalogenated carbon compounds a method is known in which the perhalogenated carbon compounds are dissolved in a liquid hydrocarbon compound. The finely divided metal is dispersed in this solution. The solvent is removed in vacuum under continuous stirring at room temperature or at a slightly higher temperature. The mass then obtained can be easily moulded to mouldings of any kind. In case of ignition a reaction occurs between the finely divided metal and the perfluo-rinated carbon compound during which no volatile or gaseous compounds must be formed.

To manufacture these mixtures lithium and its alloys with calcium, magnesium, aluminium etc. are proposed. Particularly polytrifluorochloroethylene having a molecular weight of approximately 1000 is usable as a perhalogenated carbon compound. Hexane, heptane, benzene and xylene are proposed as solvents.

It was found that when the said reaction mixtures were ignited in closed reactors a dangerous rise in pressure may still sometimes occur.

An object of the invention is to avoid this rise in pressure when using reaction mixtures of the kind described above. This object is achieved according to the invention in that in the manufacture of the reaction mixtures only liquid perhalogenated carbon compounds are used as solvents.

Suitable liquid perhalogenated carbon compounds are, for example, trichlorofluoromethane, dibromodifluoromethane, trifluorotrichloroethane, dichlorotetrafluoroethane, trifluoromonochloroethylene.

It has been found that the use of these solvents completely eliminates the danger of a rise in pressure. The rise in pressure was presumably caused by volatile products formed during the reaction by decomposition of solvent residues in masses obtained by the method according to the invention cannot form volatile products during the reaction.

The invention will be further described with reference to the following example.

EXAMPLE 33 gms of polytrifluorochloroethylene having a mean molecular weight of approximately 1000 were dissolved in 600 mls of dibromodifluoromethane. 100 gms of lithium powder were dispersed in this solution. Under continuous stirring the solvent was removed at room temperature by exhausting the solvent vapours.

The mixture of lithium and polytrifluorochloroethylene obtained in this manner reaches a temperature of approximately 650°C after ignition. During the reaction between lithium and polytrifluochloroethylene no vapours or gases were formed. The mixture may thus be ignited in a closed space without the danger of explosion.

Similarly a mixture of 100 gms of lithium and 25 gms of polytrifluorochloroethylene was manufactured. The solvent was dichlorotetrafluoroethane. After ignition a temperature of approximately 590°C was reached. Vapours or gases were not formed.

The method according to the invention particularly has the advantage that the reaction mixtures after the manufacture need not be dried intensively for a long period so as to substantially remove all solvent residues enclosed. When using very reactive metals such as, for example, potassium and sodium, special precautions are, of course, necessary so as to avoid explosions, for example, by working with smaller quantities and/or by preliminary passivation through superficial oxidation of the relevant metal powders.

What is claimed is:

1. A method of manufacturing a mixture of finely divided metals or alloys and solid perhalogenated carbon compounds capable of reaction upon ignition without the formation of gases or vapors, said method comprising forming a solution of said solid polyhalogenated carbon compounds in a solvent consisting of liquid perhalogenated compounds, dispersing said finely divided metal or alloy in said solution and removing said solvent from said solution.

2. The method of claim 1 wherein the perhalogenated carbon compound contains chlorine and fluorine atoms.

* * * * *